H. JOSEPHSON.
BRAKE MECHANISM.
APPLICATION FILED JULY 19, 1917.
1,318,497.
Patented Oct. 14, 1919.
2 SHEETS—SHEET 1.
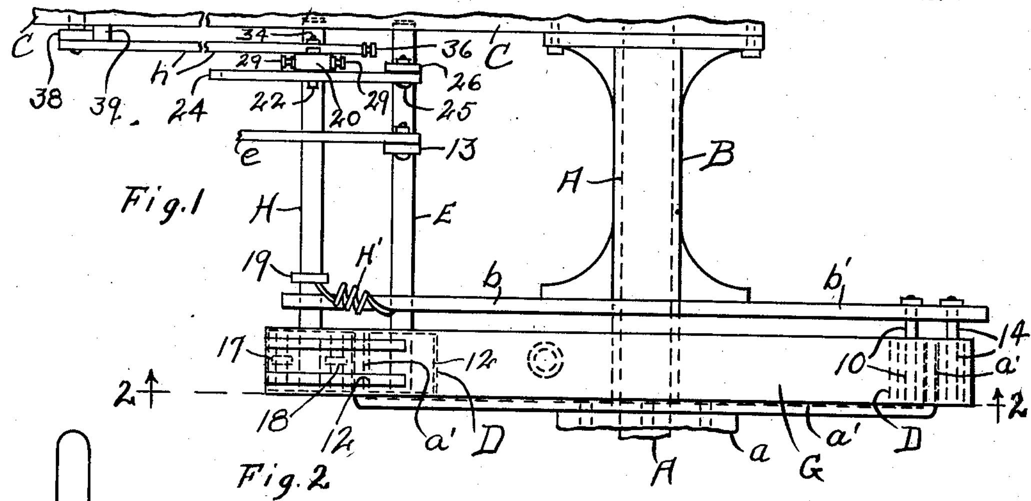
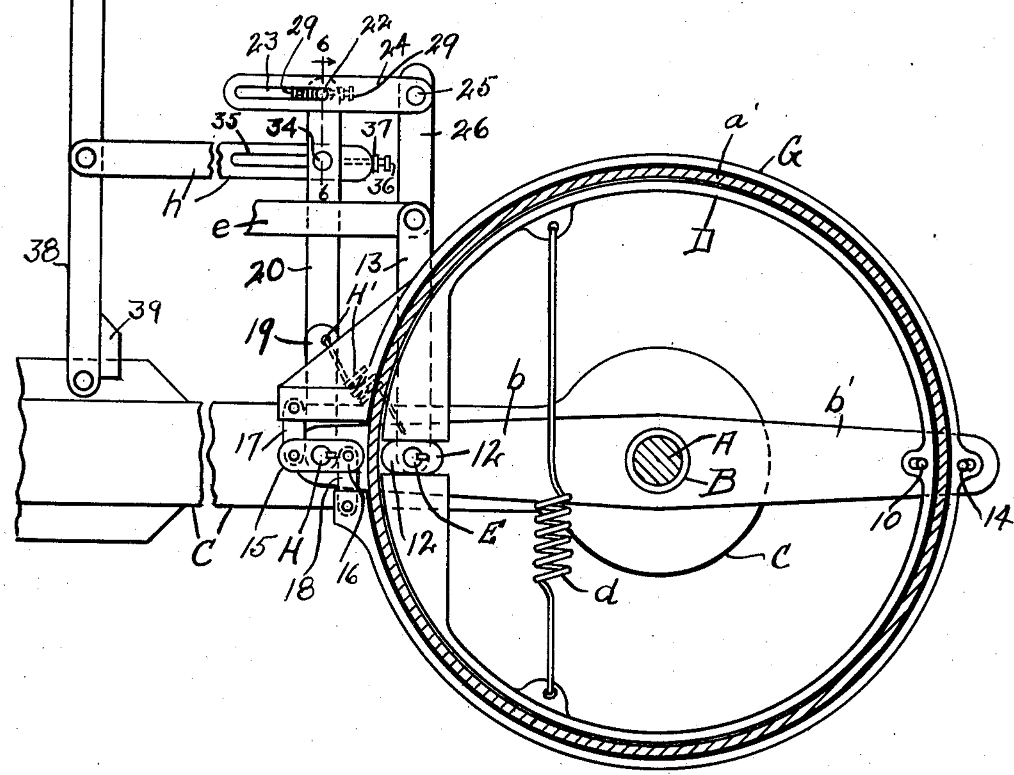
Witnesses.
Casper J. Dorer.
B. C. Brown.
Inventor.
Henry Josephson
By Chas. F. Dorer
his Attorney.

H. JOSEPHSON.
BRAKE MECHANISM.
APPLICATION FILED JULY 19, 1917.
1,318,497. Patented Oct. 14, 1919.
2 SHEETS—SHEET 2.
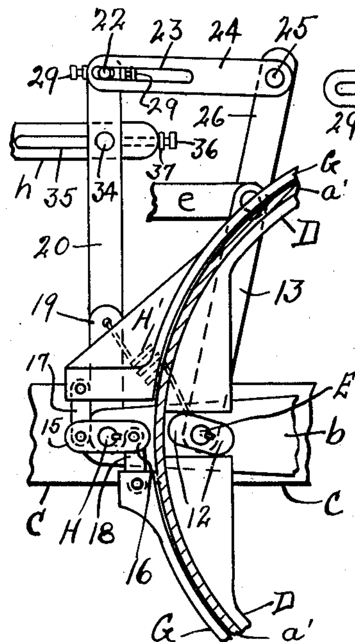
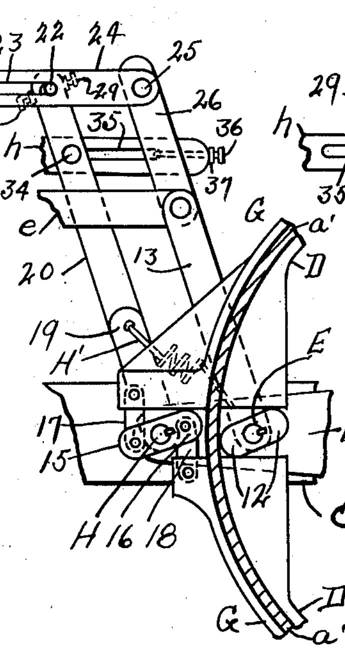
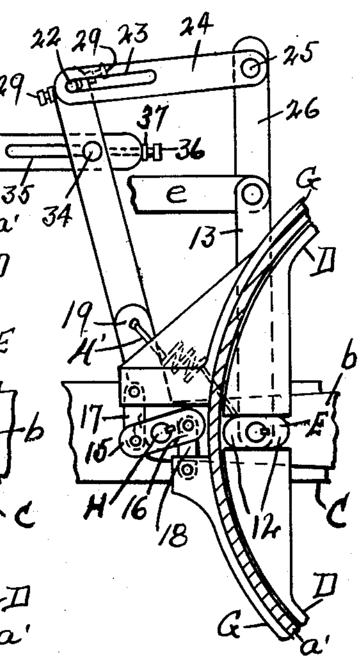
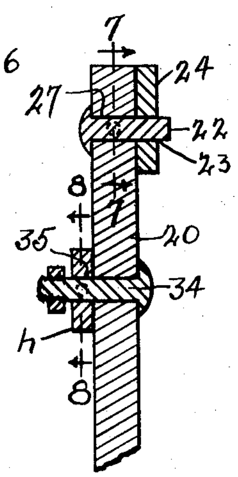
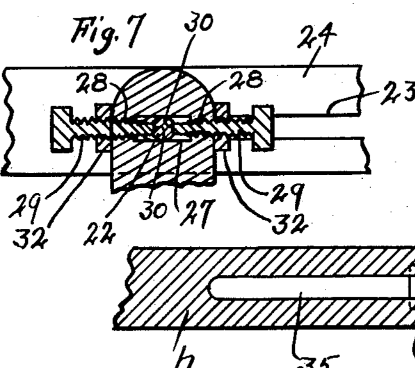
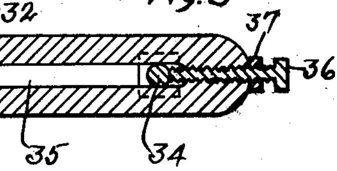
Witnesses.
Caspar J. Dorer.
B. C. Brown.
Inventor.
Henry Josephson
By Chas. H. Dorer
his Attorney.

UNITED STATES PATENT OFFICE.

HENRY JOSEPHSON, OF CLEVELAND, OHIO.

BRAKE MECHANISM.

1,318,497. Specification of Letters Patent. Patented Oct. 14, 1919.

Application filed July 19, 1917. Serial No. 181,566.

*To all whom it may concern:*

Be it known that I, HENRY JOSEPHSON, a citizen of the United States of America, residing at Cleveland, in the county of Cuyahoga and State of Ohio, have invented certain new and useful Improvements in Brake Mechanism; and I hereby declare the following to be a full, clear, and exact description of the invention, such as will enable others skilled in the art to which it pertains to make and use the same.

This invention relates to improvements in brake mechanism for automobiles or motor-vehicles.

One object of this invention is not only to provide brake mechanism of the character indicated comprising means for effecting the actuation of one brake-shoe into its braking position during the actuation of another brake-shoe into its braking position, but to render each brake-shoe capable of being actuated into its braking position independently of the other brake-shoe.

Another object is to provide such an operative connection between said brake-shoe and a suitably operated endwise shiftable rod that only one brake-shoe is actuated into its braking position, or both brake-shoes are shifted into their braking position, according as said rod is actuated endwise in the one or the other direction.

Another object is to have the last-mentioned brake-shoe, notwithstanding said operative connection between said rod and both brake-shoes, shiftable independently into its braking position.

Another object is to effect the actuation of one brake-shoe into its braking position during the actuation of one rod endwise in one direction, to effect the actuation of another brake-shoe into its braking position during the actuation of another rod endwise in one direction, and to effect the actuation of both of said brake-shoes into their braking position during the actuation of one of said rods in the opposite direction.

Another object is to have two brake-shoes normally loose relative to and shiftable into braking engagement with one and the same brake-drum, to provide means whereby said brake-shoes are shiftable simultaneously into braking engagement with said drum, and to have each of said brake-shoes shiftable into braking engagement with the drum independently of the other of said brake-shoes.

Another object is to have one brake-shoe arranged internally of an annular brake-member of a brake-drum, to have another brake-shoe arranged externally of said brake-member of said drum, and to render said brake-shoes capable of being actuated independently or simultaneously into braking engagement with said brake-member of the drum.

Another object is not only to provide such an operative connection between a brake-operating rock-shaft having an arm and one brake-shoe that said brake-shoe is actuated into its braking position during the required rotation of said shaft, and to provide mechanism for effecting the actuation of said arm in the direction required to effect said rotation of said shaft during the actuation of another brake-shoe into its braking position, and to provide such an operative connection between said arm and an endwise shiftable rod that endwise movement of said rod in said direction effects the actuation of said arm in said direction against the action of resilient means, but to render the last-mentioned brake-shoe capable of being actuated into its braking position independently of said arm and rod and to have the aforesaid actuation of said arm by the aforesaid mechanism independent of said rod, so that braking movement of the aforesaid shaft can be effected independently of or by said rod and the last-mentioned brake-shoe can be actuated, independently of said rod, into its braking position independently of or simultaneously with the first-mentioned brake-shoe.

Another object is to provide such an operative connection between one brake-shoe and a lever adapted for use in the actuation of said brake-shoe into its braking position that said brake-shoe can be actuated into its braking position by the required operation of or independently of said lever, and to provide such means as will render another brake-shoe capable of being actuated, independently of said lever, into its braking position independently of or simultaneously with the first-mentioned brake-shoe.

Another object is to render my improved brake mechanism simple and durable in construction and reliable in its operation, to provide for and facilitate relative adjustment of component parts of said mechanism, and to render the construction and relative arrangement of the parts such that the component parts are readily assembled and not liable to get out of order.

With these objects in view, and to attain any other object hereinafter appearing, this invention consists in certain features of construction, and combinations and relative arrangement of parts, hereinafter described in this specification, pointed out in the claims, and illustrated in the accompanying drawings.

In said drawings, Figure 1 is a top plan illustrating brake-mechanism embodying my invention, and portions are broken away in this figure to reduce the size of the drawing. Fig. 2 is a vertical section taken along the line 2—2, Fig. 1. Figs. 3, 4 and 5 show a portion of Fig. 2, but in Fig. 2 both illustrated brake-shoes are shown in their normal and non-braking position, whereas both of the brake-shoes are shown actuated into their braking position in Fig. 4, and Figs. 3 and 5 illustrate the actuation of said brake-shoes into their braking position independently of each other. Fig. 6 is a vertical section, in detail, taken along the line 6—6, Fig. 2. Fig. 7 is a vertical section, in detail, taken along the line 7—7, Fig. 6. Fig. 8 is a vertical section, in detail, taken along the line 8—8, Fig. 6. Figs. 6, 7 and 8 are drawn on a larger scale than Figs. 1, 2, 3, 4 and 5.

Referring to said drawings, A indicates a suitable operated rotatable rear axle-section of an automobile or motor-vehicle, and *a* indicates the hub of a wheel operatively connected with said axle-section. A casing B, which is rigid with the transmission-case C of the automobile, surrounds said axle-section, and a brake-drum, arranged adjacent the inner end of the hub *a* and suitably secured to said hub, has its annular brake-member *a′* arranged concentrically relative to said hub and the connected axle-section. The casing B is provided, at the inner end of the brake-drum, with two arms *b* and *b′* projecting forwardly and rearwardly respectively.

D indicates the inner brake-shoe arranged internally of the brake-drum and held from rotating by a stud 10 rigid with the rearwardly extending arm *b′* of the axle-casing B. Said brake-shoe is normally in suitable proximity and loose relative to the internal surface of the annular brake-member *a′* of the brake-drum and adapted to be actuated into braking engagement with said member of the drum. It will be observed therefore that said brake-shoe is normally in its non-braking position. Said brake-shoe extends circumferentially of the axle-section A nearly but not entirely around said axle-section and therefore has its terminal ends spaced circumferentially of the brake-drum. Preferably said ends of said brake-shoe are arranged adjacent the forward side of the brake-drum.

A horizontally arranged brake-operating rock-shaft E, which is substantially parallel with and forward of the axle-section A, is supported in any approved manner, as, for instance, from the transmission-case C and from the forward arm *b* of the axle-casing. Said shaft extends between the terminal ends of the brake-shoe D and is provided with two cams 12 arranged at the forward side and rear side respectively of the shaft and adapted to engage and farther separate said ends of said brake-shoe during the rotation of the shaft the extent required in the one or the other direction and thereby actuate said brake-shoe into its braking position, shown in Figs. 3 and 4, against the action of a suitably applied spiral spring *d*, and cause said brake-shoe to clampingly engage the internal surface of the brake-member *a′* of the brake-drum. The spring *d* extends, as shown in Fig. 2, between and is suitably attached to opposite end-portions of the brake-shoe D. The cam-shaft E has an upwardly extending arm 13 operatively connected with a rod *e* extending forwardly from said arm and adapted to be operated by a lever not shown, and obviously said brake-shoe is actuated into its braking position during the actuation of said rod endwise in the one or the other direction.

G indicates the outer brake-shoe which is arranged externally and extends circumferentially of the brake-member *a′* of the brake-drum. Said outer brake-shoe is normally loose relative to and adapted to be actuated into braking engagement with the brake-drum. It will be observed therefore that said outer brake-shoe is normally in its non-braking position. Said outer brake-shoe is held from rotating or movement circumferentially of the brake-drum by a stud 14 rigid with the rearward arm *b′* of the axle-casing B. Said outer brake-shoe extends circumferentially of and nearly but not entirely around the brake-drum and preferably has its terminal ends arranged adjacent the forward side of the drum and spaced circumferentially of the drum.

A horizontally arranged brake-operating rock-shaft H, which is substantially parallel with and forward of the cam-shaft E, is supported in any approved manner, as, for instance, from the transmission-case C and from the forward arm *b* of the axle-casing B. The forward shaft H extends between the terminal ends of the outer brake-shoe G and is arranged therefore forward of the brake-drum. Said forward shaft is provided between said ends of said outer brake-shoe with two arms 15 and 16 projecting forwardly and rearwardly respectively. The upper terminal end of said outer brake-shoe is operatively connected by a link 17 with the forwardly projecting arm 15 of said forward shaft. The lower terminal end of said outer brake-shoe is operatively connected by a link 18 with the rearwardly projecting arm 16 of said forward shaft. Said forward shaft is shown provided adjacent the forward arm *b* of the axle-casing B with a short upwardly projecting arm 19, and a suitably applied spiral spring H′, shown attached at one end to said arm and at its opposite end to the shaft-arm 19, (see Fig. 1,) acts to retain said shaft and the connected links 17 and 18 in their normal position in which the outer brake-shoe is loose relative to the brake-drum. Obviously therefore said forward shaft is adapted to make its braking movement against the action of the spring H′.

The forward shaft H also has an upright arm 20 which is provided at its upper end with a pin 22 projecting laterally of said arm into a slot 23 formed in and extending laterally through and longitudinally of a link 24 which extends forwardly from and is pivoted, as at 25, to an upright arm 26 of the rearward shaft E. In the normal position of the parts, as shown in Fig. 2, the pin 22 is arranged next forward of the forwardly facing rear end wall of the slot 23. It will be observed therefore that, when the inner brake-shoe D is actuated into its braking position by the means comprising the cams 12 of the rearward brake-operating shaft E during the rotation of said shaft by the endwise movement of the rod *e* in a forward direction, the forwardly facing rear end wall of the slot 23 in the link 24 actuates the pin 22, and consequently the shaft-arm 20, forwardly as required to effect the braking movement of the forward brake-operating shaft H, and results, through the medium of the arms 15 and 16 of said forward shaft and the links 17 and 18, in the actuation of the outer brake-shoe G into its braking position against the action of the spring H′. By the construction hereinbefore described it will be observed that the rod *e*, the rearward brake-operating shaft E and its arms 13 and 26 and the link 24 constitute mechanism, during the forward movement of said rod, for effecting the forward actuation of the arm 20 of the forward brake-operating shaft H and thereby rotating said forward shaft in the direction required to actuate the outer brake-shoe G into its braking position, as shown in Fig. 4, and that during said movement of said rod the cams 12 of the rearward shaft E effect the actuation of the inner brake-shoe D into its braking position, as shown in Fig. 4.

The slot 23 in the link 24 extends forwardly from the engaging pin 22 such a distance that said link idly moves transversely of said pin during the actuation of the rod *e* rearwardly as required to effect the actuation of the inner brake-shoe D into its braking position, as shown in Fig. 3, independently of the arm 20 of the forward shaft H and consequently independently of the outer brake-shoe.

Preferably the pin 22 and the link 24 are relatively adjustable to permit and facilitate positioning of said pin next forward of the forwardly facing rear end wall of the slot 24. Preferably, the pin 22 (see Figs. 6 and 7) extends through a slot 27 formed in the shaft-arm 20 and arranged transversely of said shaft-arm and consequently longitudinally of said link. Preferably the shaft-arm 20 is provided at each end of its slot 27 with a screw-threaded hole 28 which is arranged in line endwise with said slot and extends from said slot to the exterior of said shaft-arm, and said hole is engaged by a correspondingly screw-threaded adjusting screw 29. Preferably each screw 29 (see Fig. 7) engages a cavity 30 formed in said pin 22 so as to positively prevent endwise displacement of said pin. Obviously said pin 22 can be readjusted transversely of the shaft-arm 20, and consequently longitudinally of the link 24, by a proper manipulation of the adjusting screws 29, and said screws are secured in the desired adjustment by tightening the lock-nuts 32 which are shown mounted externally of said shaft-arm on said screws, and said pin is firmly held by and between said screws.

The arm 20 of the forward brake-operating shaft H is provided with another pin 34 shown spaced downwardly from the pin 22 and projecting laterally of said arm into a slot 35 formed in and extending laterally through and longitudinally of a rod *h* which extends forwardly from said arm and is adapted to be employed in actuating said arm forwardly independently of the link 24 as required to rotate said forward shaft independently of the rearward brake-operating shaft E and in the direction required to effect the actuation of the outer brake-shoe G into its braking position, so that the forward movement of said rod *h* independently of the rod *e* results in the actuation of the said outer brake-shoe into its braking position independently of the inner brake-shoe D. The pin 34 of the shaft-arm 20 (see Fig. 8) is shown abutting at its rear side against the forward or inner end of a screw 36 which is threaded into the rear end wall of the slot 35 and arranged in line endwise and extending into said slot and has its inner end arranged to form an abutment for said pin of said shaft-arm. It will be observed therefore that said abutment for the pin 34 is adjustable endwise of the rod *h*, and that consequently the abutment-forming screw 36 and said pin are relatively adjustable to facilitate establishing operative connection, during the assemblage of the parts, between said pin and said rod. A lock-nut 37 is mounted on the screw 36 externally of and at the rear end of the rod *h* and locks said screw in the desired adjustment. Obviously upon manipulating the lock-nut 37 to loosen it relative to the rod *h* the screw 36 of said rod is rendered free to be manipulated as required to readjust said screw endwise of said rod, whereupon said lock-nut is manipulated as required to retighten it relative to said rod.

The rod *h* (see Figs. 1 and 2) is shown operatively connected with a suitably supported lever 38, and it will be observed that said rod and its screw 36, the shaft H and its arms 15 and 16, and the links 17 and 18, form such an operative connection between said lever and the outer brake-shoe G that movement of said lever in the direction required to actuate said rod forwardly results in the actuation of said brake-shoe into its braking position. A stop formed by an arm 39 of the transmission-case C prevents movement of the lever 38 in the opposite direction.

The slot 35 in the rod *h* extends such a distance forwardly of the engaging pin 34 of the shaft-arm 20 that said arm is movable forwardly independently of said rod, so that endwise movement of said rod and disturbance of the lever 38 during the actuation of said arm forwardly by the link 24 during the forward endwise movement of the rod *e*, as required to actuate the outer brake-shoe and the inner brake-shoe simultaneously into their braking position, are avoided.

By the construction hereinbefore described it will be observed that my improved brake-operating means comprises mechanism (the cam-shaft and its arm 13) for actuating the inner brake-shoe D into its braking position and that said mechanism is operated to actuate said inner brake-shoe into its braking position by and during endwise movement of the rod *e* in the one or the other direction; that the rock-shaft H and its arms 15, 16 and 20 and the links 17 and 18 constitute mechanism whereby the outer brake-shoe G is actuated into its braking position independently of the rod *e* and inner brake-shoe; that the pin 22 of the shaft-arm 20, the forwardly facing end wall of the slot 23 in the link 24 and the arm 26 of the cam-shaft constitute means forming such an operative connection between the shaft-arm 20 and the cam-shaft that, during the actuation of the inner brake-shoe into its braking position by the forward actuation of the rod *e*, the shaft-arm 20 is actuated forwardly as required to effect the rotation of the rock-shaft H in the direction required to actuate the outer brake-shoe into its braking position; that the rod *e* and the connected mechanism consisting of the cam-shaft and its arm 13 for actuating the inner brake-shoe into its braking position during rearward endwise movement of said rod are, during said movement of said rod, independent of the rod *h* and the mechanism comprising the rock-shaft H and its arms 15, 16 and 20 and the links 17 and 18; that the rod *h* and the connected mechanism (the shaft H and its arms 15, 16 and 20 and the links 17 and 18) for actuating the outer brake-shoe into its braking position during forward endwise movement of the rod *h* by the lever 38 are, during said movement of said rod, independent of the rod *e* and the mechanism comprising the cam-shaft and its arm 13, and that obviously the actuation of the inner brake-shoe into its braking position by and during rearward endwise movement of the rod *e* and the forward endwise movement of the rod *h* to effect the actuation of the outer brake-shoe into its braking position are wholly independent of each other without interfering with the actuation of the inner brake-shoe into its braking position by and during forward endwise movement of the rod *e*.

What I claim is:—

1. The combination, with two brake-shoes, and a movable actuating member, said brake-shoes being in their non-braking position in the normal position of said actuating member, and said actuating member being movable in the one or the other direction from its normal position, of means whereby both brake-shoes are operated during movement of said actuating member in one direction from its normal position and only one of said brake-shoes is operated during movement of said actuating member in the opposite direction from its normal position.

2. The combination, with two brake-shoes, and a forwardly and rearwardly extending endwise shiftable rod, said brake-shoes being in their non-braking position in the normal position of said rod, and said rod being movable forwardly or rearwardly from its normal position, of means whereby, when said rod is moved forwardly, both brake-shoes are operated and, when said rod is moved rearwardly only one of said brake-shoes is operated.

3. The combination, with two brake-shoes, and an actuating member, said brake-shoes being in their non-braking position in the normal position of said actuating member, and said actuating member in said position being movable in the one or the other direction, of mechanism operatively connected with said actuating member and with one brake-shoe and adapted to be operated to operate said brake-shoe during movement of said actuating member in one direction from its normal position, mechanism operatively connected with the other brake-shoe and adapted to be operated to operate said brake-shoe independently of the aforesaid actuating member, and means forming an operative connection between said actuating member and the second-mentioned mechanism during the actuation of said actuating member in the opposite direction from its normal position.

4. The combination, with two brake-shoes, and an endwise shiftable rod, said brake-shoes being in their non-braking position in the normal position of said rod, and said rod in its normal position being movable in the one or the other direction, of mechanism operatively connected with said rod and with one brake-shoe and adapted to be operated to operate said brake-shoe during movement of said rod endwise in one direction from its normal position, mechanism operatively connected with the other brake-shoe and adapted to be operated to operate said brake-shoe independently of said rod, and means forming an operative connection between said rod and the second-mentioned mechanism during movement of said rod endwise in the opposite direction from its normal position.

5. In brake-mechanism, a brake-shoe normally in its non-braking position, a rock-shaft having an arm, such an operative connection between said shaft and the aforesaid brake-shoe that said brake-shoe is actuated into its braking position during the required rotation of said shaft, mechanism for effecting the actuation of the aforesaid arm in the direction required to effect said rotation of said shaft, an endwise shiftable rod, said arm being movable independently of said rod in said direction and independently of the aforesaid mechanism, and such an operative connection between said rod and said arm that endwise movement of said rod in said direction effects the actuation of said arm independently of said mechanism.

6. In brake-mechanism, a brake-shoe normally in its non-braking position, a rock-shaft having an arm provided with a laterally projecting pin, such an operative connection between said shaft and the aforesaid brake-shoe that said brake-shoe is actuated into its braking position during the rotation of said shaft in the required direction, mechanism for effecting the actuation of the aforesaid arm in the direction required to effect said rotation of said shaft, and an endwise shiftable rod adapted during endwise movement thereof in one direction to effect said rotation of said shaft and provided with a longitudinal slot which is engaged by the aforesaid pin and having an abutment for said pin at one side of the pin, said slot extending such a distance beyond the opposite side of said pin in said direction as to render said arm movable in said direction independently of said rod, said pin and said abutment being relatively adjustable.

7. In brake-mechanism, a brake-shoe normally in its non-braking position, a rock-shaft having an arm provided with a laterally projecting pin, such an operative connection between said shaft and the aforesaid brake-shoe that said brake-shoe is actuated into its braking position during the required rotation of said shaft, mechanism for effecting the actuation of the aforesaid arm in the direction required to effect said rotation of said shaft, and an endwise shiftable rod adapted during endwise movement thereof in one direction to effect said rotation of said shaft and provided with a longitudinal slot which is engaged by the aforesaid pin and having a screw which is threaded into the rod and extends into and endwise of the slot and forms an abutment for said pin at one side of the pin, said slot extending such a distance beyond the opposite side of said pin in said direction as to render said arm movable in said direction independently of said rod.

8. In brake-mechanism a brake-shoe normally in its non-braking position, a rock-shaft having an arm, such an operative connection between said shaft and the aforesaid brake-shoe that said brake-shoe is actuated into its braking position during the required rotation of said shaft, mechanism for effecting the actuation of said arm in the direction required to effect said rotation of said shaft, an endwise shiftable rod, resilient means, such an operative connection between said rod and said arm that endwise movement of said rod in one direction effects the aforesaid actuation of said arm against the action of said resilient means, another brake-shoe normally in its non-braking position, and means for actuating the last-mentioned brake-shoe into its braking position during the operation of the aforesaid mechanism in effecting the aforesaid actuation of the aforesaid arm, said arm being movable independently of the aforesaid rod in the direction in which said rod moves during the aforesaid actuation of said arm by said rod.

9. In brake-mechanism, a brake shoe normally in its non-braking position, a rock-shaft having an arm, such an operative connection between said shaft and the aforesaid brake-shoe that said brake-shoe is actuated into its braking position during the required rotation of said shaft, an endwise shiftable rod, such an operative connection between said rod and the aforesaid arm that endwise movement of said rod in one direction effects the aforesaid rotation of said shaft, mechanism independent of said rod for effecting the actuation of said arm in the direction required to effect said rotation of said shaft, said mechanism comprising a rock-shaft having an arm, and such an operative connection between said arm of the second-mentioned shaft and the aforesaid arm of the first-mentioned shaft that the aforesaid rotation of said first-mentioned shaft is effected during the actuation of said arm of the second-mentioned shaft in the direction in which said arm of the first-mentioned shaft is actuated to effect said rotation of said first-mentioned shaft, said arm of said first-mentioned shaft being movable in said direction independently of said arm of the second-mentioned shaft and independently of the aforesaid rod.

10. In brake-mechanism, a brake-shoe normally in its non-braking position, a rock-shaft having an arm, such an operative connection between said shaft and the aforesaid brake-shoe that said brake-shoe is actuated into its braking position during the required rotation of said shaft, another brake-shoe normally in its non-braking position, mechanism for effecting the actuation of said arm in the direction required to effect the aforesaid rotation of said shaft, said mechanism comprising a rock-shaft having an arm and instrumental in effecting the actuation of the second-mentioned brake-shoe into its braking position, and a link pivoted to said arm of said second-mentioned shaft and extending from said arm of said second-mentioned shaft to and beyond the aforesaid arm of the first-mentioned shaft and having a lateral slot extending longitudinally of the link, said arm of said first-mentioned shaft being provided with a pin, said slot being engaged, adjacent its end wall which faces in the direction in which said arm of said first-mentioned shaft is actuated to effect the aforesaid rotation of said first-mentioned shaft, by said pin, and said pin being adjustable endwise of said slot.

11. In brake-mechanism, a brake-shoe normally in its non-braking position, a rock-shaft having an upright arm, such an operative connection between said shaft and the aforesaid brake-shoe that said brake-shoe is actuated into its braking position during the required rotation of said shaft, another brake-shoe normally in its non-braking position, mechanism instrumental in effecting the actuation of the aforesaid arm in the direction required to effect said rotation of said shaft and comprising a rock shaft arranged rearward of the first-mentioned or forward shaft and instrumental in effecting the actuation of the second-mentioned brake-shoe into its braking position and having an upright arm, and a link pivoted to said arm of the rearward shaft and extending forwardly from said arm of said rearward shaft to and beyond the aforesaid arm of the forward shaft and having a lateral slot extending longitudinally of the link, said arm of the forward shaft being provided with a pin extending into said slot adjacent the rear end of the slot and being adjustable endwise of the link.

12. In brake-mechanism, a brake-shoe normally in its non-braking position, a rock-shaft having an arm, such an operative connection between said shaft and the aforesaid brake-shoe that said brake-shoe is actuated into its braking position during the required rotation of said shaft, mechanism instrumental in effecting the actuation of said arm in the direction required to effect said rotation of said shaft and comprising a rock-shaft having an arm, a link pivoted to said arm of the second-mentioned shaft and extending from said arm of said second-mentioned shaft to and beyond the aforesaid arm of the first-mentioned shaft and having a lateral slot extending longitudinally of the link, said arm of said first-mentioned shaft being provided at one side of said link with a slot extending endwise of the link, a pin extending from within said slot in the link into the slot in said arm of said first-mentioned shaft, and two screws arranged in line endwise with the last-mentioned slot at opposite sides respectively of and supporting said pin and threaded into said arm of said first-mentioned shaft.

13. The combination, with a rotary member, a brake-drum connected and rotatable with and arranged concentrically relative to said rotary member, and two brake-shoes normally loose relative to and shiftable into braking engagement with the drum, of an endwise shiftable rod, and means whereby only one brake-shoe is actuated into braking engagement with the drum, or both brake-shoes are actuated into braking engagement with the drum, according as said rod is actuated endwise in the one or the other direction.

14. The combination, with a rotary member, a brake-drum connected to and rotatable with said rotary member, an outer brake-shoe arranged externally of and normally loose relative to said drum, and an inner brake-shoe arranged internally of and normally loose relative to the drum, of a rock-shaft having an arm, such an operative connection between said shaft and the outer brake-shoe that said outer brake-shoe is actuated into its braking engagement with the drum during the rotation of said shaft in the required rotation, mechanism for effecting the actuation of the aforesaid arm in the direction required to effect said rotation of said shaft, an endwise shiftable rod, means whereby endwise movement of said rod in one direction effects the aforesaid actuation of said arm, and means for actuating the inner brake-shoe into braking engagement with the drum during the operation of the aforesaid mechanism in effecting the aforesaid actuation of the aforesaid arm, said arm being movable independently of said rod in the direction in which said rod moves during the aforesaid actuation of said arm by said rod.

In testimony whereof, I sign the foregoing specification, in the presence of two witnesses.

HENRY JOSEPHSON.

Witnesses:
CASPER J. DORER,
B. C. BROWN.